(12) United States Patent
Krow, Jr. et al.

(10) Patent No.: US 6,374,030 B2
(45) Date of Patent: *Apr. 16, 2002

(54) CONNECTOR CLEANING INSERT AND ASSEMBLY

(75) Inventors: Karl DeWald Krow, Jr., Harrisburg; Lee Andrew Barkus, Millersburg, both of PA (US)

(73) Assignee: The Whitaker Corporation, Wilm., DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/456,960

(22) Filed: Dec. 7, 1999

(51) Int. Cl.[7] ............................... G02B 6/00; G02B 6/36
(52) U.S. Cl. ............................. 385/134; 385/53; 385/85
(58) Field of Search ................................ 385/134, 136, 385/147, 53, 76, 77, 78, 84, 85; 134/115 R, 166 R

(56) References Cited

U.S. PATENT DOCUMENTS

| 4,690,494 A | * | 9/1987 | Hirose et al. ................. 385/60 |
| 5,325,452 A | * | 6/1994 | Stein et al. .................... 385/85 |
| 6,047,716 A | * | 4/2000 | Shimoji et al. ......... 134/166 C |
| 6,053,985 A | * | 4/2000 | Cheswick et al. ............. 134/6 |

* cited by examiner

*Primary Examiner*—Cassandra Spyrou
*Assistant Examiner*—Euncha Cherry

(57) ABSTRACT

This invention is directed to a cleaning insert and cleaning assembly to remove debris or contaminants from optical fiber connectors including connectors attached to system backplanes. The cleaning insert is treated with a cleaning agent such as an adhesive. The cleaning insert is secured in a cleaning assembly that is coupled to the connector to be cleaned. The treated cleaning insert contacts the ferrule of the optical fiber connector to remove the contaminants.

19 Claims, 5 Drawing Sheets

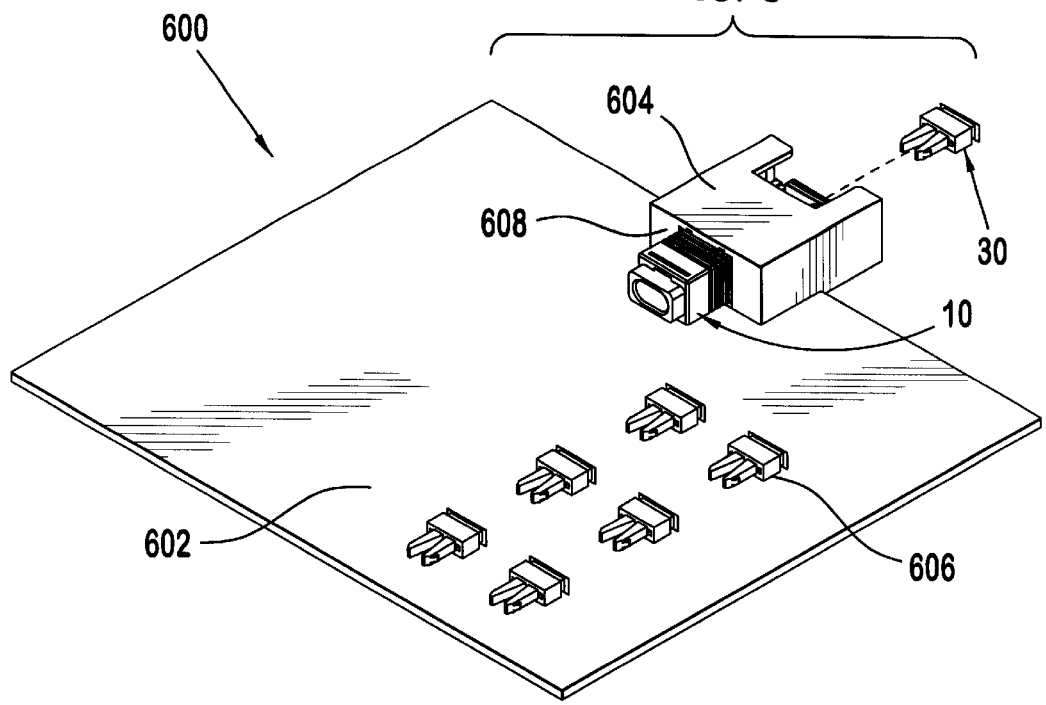
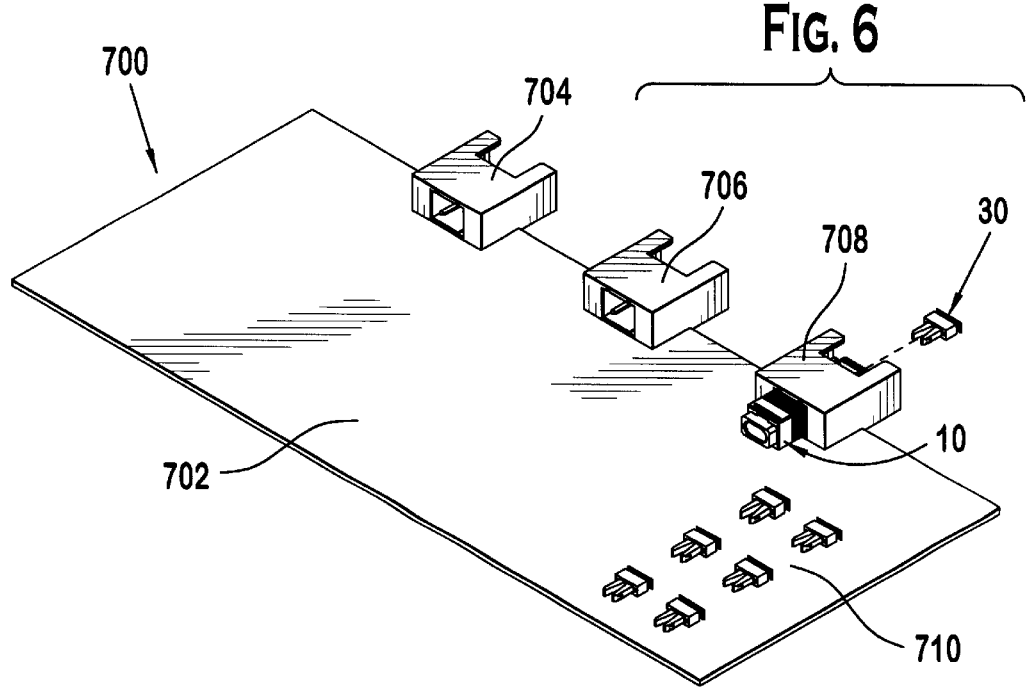

CONNECTOR CLEANING INSERT AND ASSEMBLY

BACKGROUND

This invention relates to a cleaning apparatus for fiber optic connectors.

Optical fibers are quickly replacing wires for the transmission of data in the electronics industry. Not only are the fibers small, but light data transmission rates are very high in comparison to those of wire connections. Fiber optic cables may contain one or more of these optical fibers. Connectors are used to mate several optical fibers or cables as well as connect such cables to backplanes and system cards of computer and telecommunication systems.

Such optical fiber connectors are shown in PCT publication WO/98/00741 and in FIG. 1 on the present application. Within this connector 100, a ferrule 112 precisely positions a plurality of optical fibers 108 for mating with fibers in a similar ferrule of a mating connector. The ferrule end faces are finely polished to minimize distance between the fibers on each ferrule 112. A spring in each mating connector 100 biases the ferrules 112 together. Optionally, one of the two mating connectors 100 may contain alignment pins 106 on opposite sides the ferrule 112.

A problem exists with these connectors in that dust and debris deposited between mating ferrules can contaminate the connectors and reduce or prohibit the transmission of light therebetween. Accordingly, there is a need to clean optical fiber connectors, but cleaning the connectors may be difficult especially when a cable needs to be removed from the system to perform the cleaning procedure.

For example, in large telecommunication systems an entire backplane supports attachment of numerous optical fiber cables. System cards are slid on rails and then plugged into the backplane assembly. Many of these cards contain one or more system card optical connector housings to connect the optical fiber cables mounted on the backplane to the system card. Not only are many of these cables in the backplane difficult to access, but removal of a cable is time consuming and therefore may prove financially prohibitive.

Therefore, there is a need for a cleaning tool that can remove dust and debris from a fiber optic cable connector particularly where removal of the cable is difficult. Further, there is a need to clean multiple optical fiber optic connectors mounted on a backplane simultaneously. There is also a need to clean similar fiber optic connectors on system cards.

SUMMARY

It is therefore an object of this invention to provide a cleaning tool for removing debris and dust from a connector.

It is further object of the invention to remove small pieces of debris and dust from an optical connector using a cleaning assembly which is a matable to a contaminated optical connector.

Another object of the invention is to provide a cleaning kit to clean optical fiber cables attached to a system backplane.

These and other objects have been achieved by providing a cleaning insert for use in a cleaning assembly. The cleaning insert has a main body with a cleaning pad secured on one end and a latching mechanism on the opposite end. A cleaning agent is applied to the cleaning pad and the cleaning insert is secured in a housing to form a cleaning assembly. The cleaning assembly is matable with an optical connector to be cleaned.

Other objects and advantages of the cleaning assembly and method will become apparent to those skilled in the art upon reading the detailed description.

BRIEF DESCRIPTION OF THE INVENTION

The invention will now be described by way of example with reference to the accompanying drawings of which:

FIG. 5 is a three-dimensional view of a daughter card cleaning kit.

FIG. 6 is a three-dimensional view of an alternate daughter card cleaning kit.

DETAILED DESCRIPTION OF THE PREFERRED EMBODIMENTS

Figure 1:
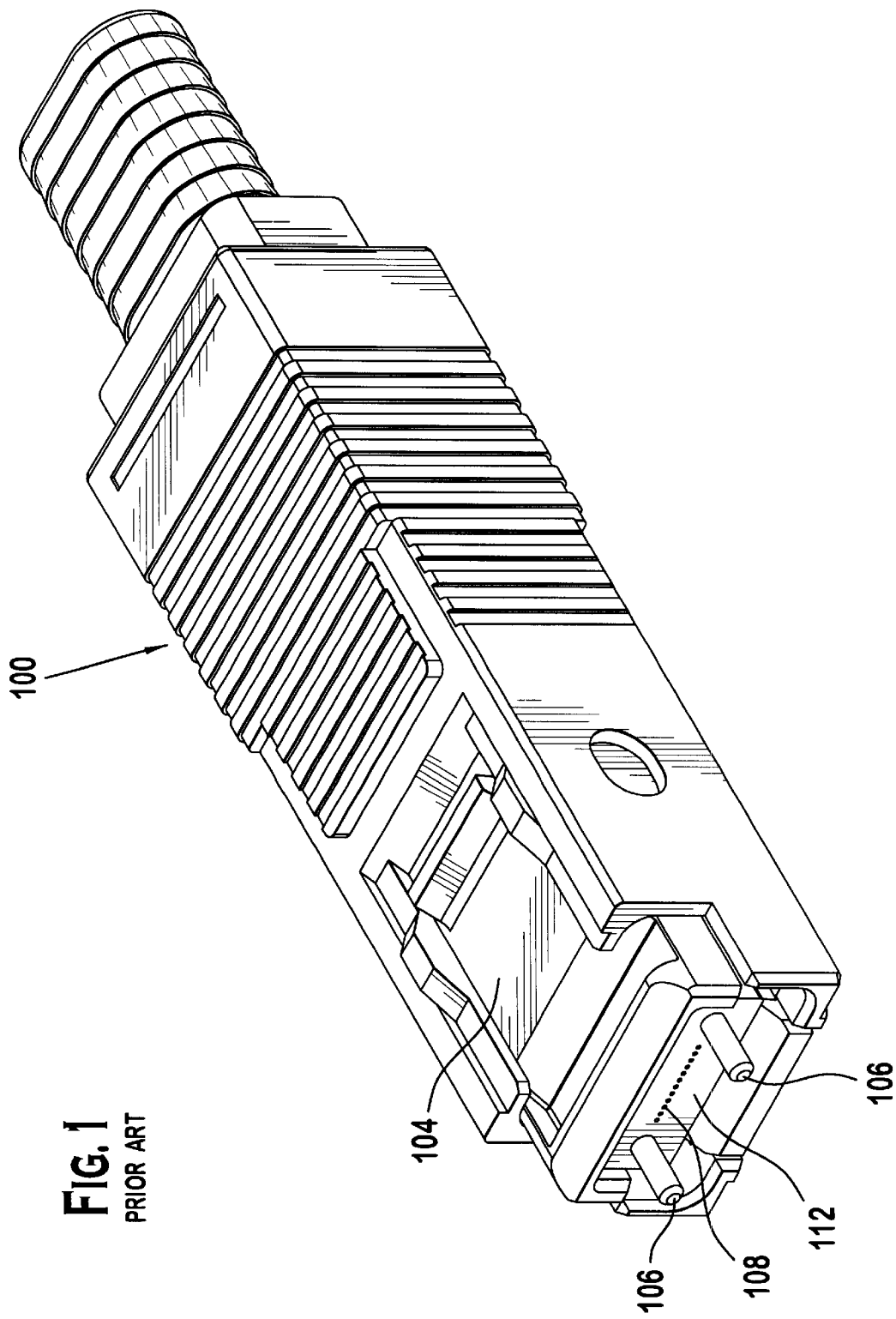
FIG. 1 is a three-dimensional view of a prior art optical connector.

An embodiment of the present invention will be described with reference to the drawing figures where like numerals represent like elements throughout. Although the embodiment illustrates cleaning a particular type of optical fiber connector, the present invention is applicable to other connectors by minor modifications.

Figure 2:
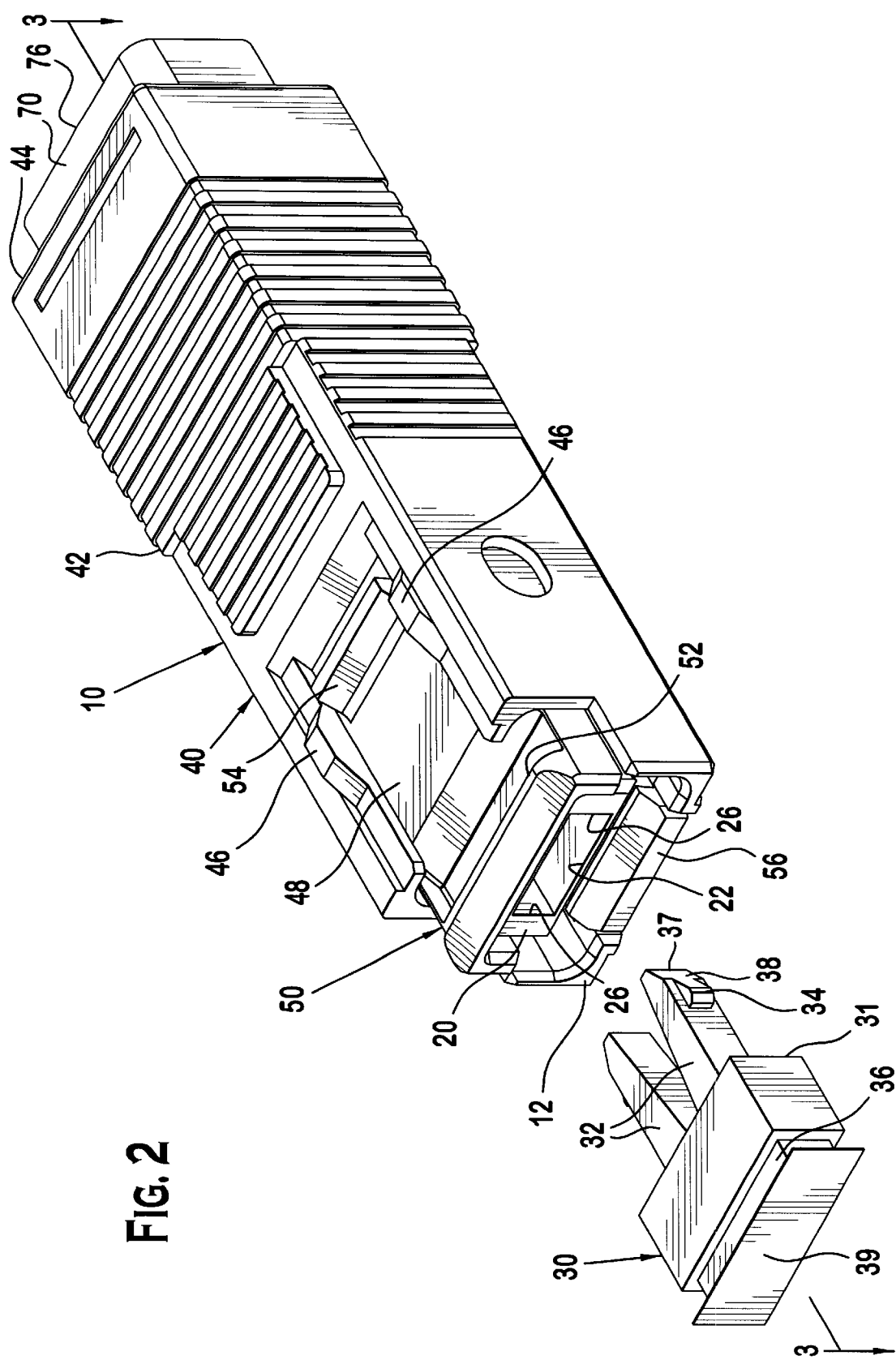
FIG. 2 is a three-dimensional view of the cleaning assembly and cleaning insert of the present invention.

The invention will first be described generally with reference to FIG. 2. A cleaning assembly 10 being matable with and having features similar to the connector 100 of FIG. 1 contains an insert holder 20 in place of the ferrule 112. The insert holder 20 is biased toward the mating end 12. An opening 22 is formed in the insert holder 20. A cleaning insert 30 fits within the opening 22.

Figure 3:
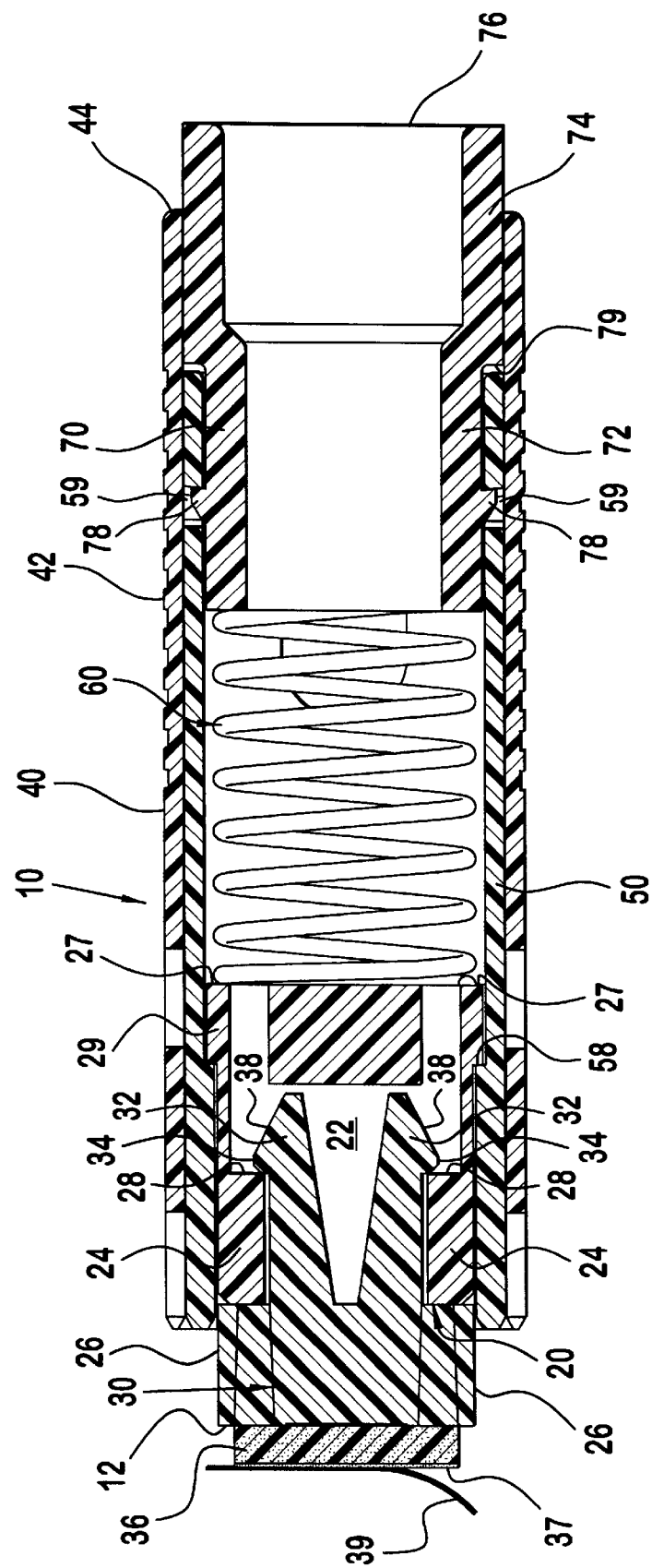
FIG. 3 is a cross-sectional view taken along the line 3—3 of FIG. 2 showing the cleaning apparatus of the present invention.

Each of the major components will now be described in greater detail with reference to FIGS. 2 and 3. Beginning with the cleaning assembly 10 and referring first to FIG. 3, the major components include an outer housing 40, and inner housing 50, an insert holder 20, a spring 60, and a rear plug 70. Referring to FIG. 2, the outer housing 40 features a grip portion 42 extending from a rear end 44 toward the mating end 12. A plurality of cams 46 are positioned around a window 48. The inner housing 50 is slidingly positioned within the outer housing 40 and projects from the window 48 and the mating end 12. The inner housing 50 features a first latching shoulder 52 positioned near the mating end 12 and a second latching shoulder 54 positioned within the window 48. A latch 56 also extends from the inner housing 50 at the mating end 12. Returning to FIG. 3, an insert stop 58 extends inward near the mating end 12 and a pair of openings 59 are disposed near the rear end 44.

The insert holder 20 has an opening 22 which extends rearward from the mating end 12. As best shown in FIG. 3, a pair of projections 24 extend inward from side walls 26 and are positioned within the opening 22. Each projection 24 has a rear shoulder 28. A wide portion 29 is disposed at the rear end 27 of the insert holder 20. A spring 60 is positioned against the rear end 27 of the insert holder 20. It should be understood by those reasonably skilled in the art that while a coil spring is shown here, other shaped springs or biasing devices which are well-known in the art could be substituted. The rear plug 70 features a narrow portion 72 and a wide portion 74. An opening 76 extends through both the narrow and wide portions 72, 74. A pair of latching projections 78 extend outward from the narrow portion 72. A shoulder 79 is positioned on an outer surface at the transition between the wide and narrow portions 74, 72.

The cleaning insert 30 will now be described in greater detail with reference to FIGS. 2 and 3. Projecting rearward from a main body 31 are a pair of resilient legs 32. Each resilient leg 32 has a projection 34 extending outward near a free end 37. A taper 38 extends from the free end 37 to the projection 34. The cleaning pad 36 is positioned on the main body 31 opposite the resilient legs 32. The cleaning pad 36 is formed of a resilient/compliant material to conform to the mating surface of a ferrule 112 to be cleaned. The material selected should not apply undue pressure on that mating surface. A suitable material for the cleaning pad 36 is acrylic foam. Depending upon the cleaning agent 37 used, another suitable material for the cleaning pad 36 is a low residue felt. A cleaning agent 37 is applied to the cleaning pad 36 opposite the main body 31 and a protective cover 39 is positioned over the cleaning agent 37. The cleaning agent 37 is preferably a slightly tacky adhesive material such as White PET 550 Adhesive. The material selected should have the ability to lift debris from the surface to be cleaned yet not leave any residue. Alternate materials such as isopropyl alcohol with a felt cleaning pad 36 could be utilized as a cleaning agent as long as the material is capable of capturing debris without leaving a residue.

Assembly of the major components will now be described in greater detail again with reference to FIG. 3. First, the inner housing 50 is inserted into the outer housing 40. Next, the insert holder 20 is inserted into the inner housing 50 until the wide portion 29 engages the insert stop 58. The spring 60 is inserted against the rear end 27 of the insert holder 20. The rear plug 70 is inserted such that the latching projections 78 reside within openings 59 and the shoulder 79 is positioned adjacent to rear end of the inner housing 50.

The cleaning insert 30 is preferably molded such that the main body 31 and resilient legs 32 are integral. Next, the cleaning pad 36 is fixed to the main body 31 preferably utilizing an adhesive. The cleaning pad 36 could be applied utilizing other methods known to those skilled in the art such as a tongue and grove joint. Next, the cleaning agent 37 is applied to the end of the cleaning pad 36. The cleaning agent 37 is preferably another adhesive which is less tacky than the adhesive utilized to fix the cleaning pad 36 to the main body 31. Alternate cleaning agents include fluids such as alcohol or distilled water. Those skilled in the art will appreciate that the cleaning agent 37 should be selected to be compatible with the material selected for the cleaning pad 36. The completed cleaning insert 30 is then inserted into the opening 22 of the insert holder 20 from the mating end 12. The tapers 38 first engage the projections 24 of the insert holder 20 to urge the resilient legs 32 of the cleaning insert 30 toward each other during insertion. The cleaning insert 30 is further urged into opening 22 until projections 34 pass over projections 24 and lock behind rear shoulders 28.

Figure 4:
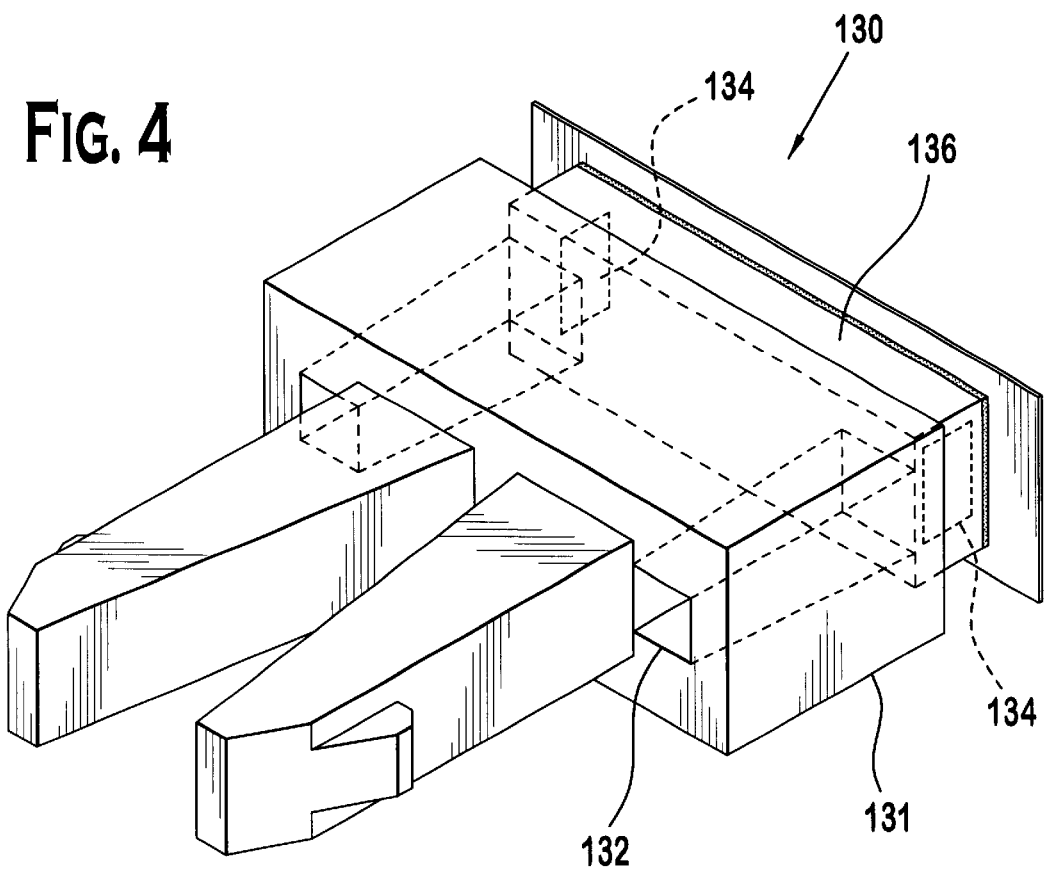
FIG. 4 is a three-dimensional view of an alternative embodiment of the cleaning insert.

An alternate cleaning insert 130 is shown in FIG. 4. This cleaning insert 130 is similar to the embodiment of FIG. 2 except that pin receiving passageways 132 extend through the main body 131 and slits 134 are formed in the cleaning pad 136. The slits 134 are aligned with the pin receiving passageways 132. Each of the pin receiving passageways 132 is preferably tapered to be larger adjacent cleaning pad 136 and smaller adjacent the resilient legs.

In use, either a cleaning insert 30 or an alternate cleaning insert 130 is inserted into the insert holder 20 of a cleaning assembly 10. The protective cover 39 is then removed from the cleaning pad 36. Next, the cleaning assembly 10 is mated with an optical connector 100 such as the one shown in FIG. 1. In this particular case, an alternate cleaning insert 130 should be utilized to receive alignment pins 106. It should be understood however that the alternate cleaning insert 130 could be utilized to clean either a connector with alignment pins 106 or a connector without alignment pins 130. The cleaning pad 36 contacts the end face of the ferrule 112. Upon unmating, any debris present on the ferrule 112 will stick to the cleaning pad 36 and removed with the cleaning assembly 10. It should be understood by those reasonably skilled in the art that while the cleaning insert 30 and cleaning assembly 10 are shown as being generally rectangular, this concept is equally adaptable to other optical connectors. For example, a cleaning insert utilizing the concepts of this invention could be adapted for use in other commercially available optical connectors such as those having round or other shaped cross sections.

The cleaning assembly 10 is adaptable for use in cleaning optical connectors mounted within a backplane assembly. Daughter cards are typically insertable into a backplane assembly along guide rails. Each daughter card may be configured to mate with several optical connectors mounted within the backplane assembly. One example of the daughter card cleaning kit 600 is shown in FIG. 5. Here, a coupling housing 604 is mounted along an edge of a daughter card 602. The cleaning assembly 10 is secured within the coupling housing 604. The cleaning insert 30 is inserted into the mating end of the cleaning assembly 10 as described above. A plurality of spare cleaning inserts 606 are mounted to the daughter card 602. The cleaning insert 30 may be removed and replaced by one of the spare cleaning inserts 606.

Another example of the daughter card cleaning kit 700 is shown in FIG. 6. This daughter card cleaning kit 700 is similar to the one shown in FIG. 5 except that several coupling housings 704, 706, and 708 are strategically mounted along the edge of the daughter card 702 to mate with optical connectors within a backplane assembly. Cleaning inserts 30 are similarly mounted to cleaning assemblies 10 which are secured within respective coupling housings 704, 706, 708. Similar spare cleaning inserts 710 are provided. In operation, either of these daughter cards 602, 702 are slid into a backplane assembly along guide rails until the cleaning assemblies 10 are mated with complimentary optical connectors within the backplane. The daughter cards 602, 702 are then removed and debris is removed from the complimentary optical connectors as described above.

What is claimed is:

1. A cleaning assembly for cleaning a ferrule contained in a connector housing of an optical connector, said optical connector being adapted to mate with a mating housing of a mating connector to effect an optical connection therebetween, said cleaning assembly comprising:

an assembly housing substantially identical to said mating housing and being capable of mating with said connector housing of said optical connector; and a cleaning insert having a cleaning pad and being disposed in said assembly housing such that, upon mating of said assembly housing with said optical connector, said cleaning pad contacts said ferrule.

2. The cleaning assembly of claim 1, wherein said assembly housing is substantially identical to said connector housing of said optical connector.

3. The cleaning assembly of claim 1, further comprising a resilient member disposed in said assembly housing such that said cleaning insert is biased toward the end of said assembly housing that mates with said optical connector.

4. The cleaning assembly of claim 1, wherein said cleaning pad is treated with a tacky substance to lift debris from said ferrule.

5. The cleaning assembly of claim 1, wherein said cleaning insert is removable from said assembly housing.

6. The cleaning assembly of claim 5, wherein said cleaning insert comprises at least one compliant leg for interengaging a portion of said assembly housing.

7. The cleaning assembly of claim 1, wherein said cleaning insert is disposed in said assembly housing in substantially the same configuration as said ferrule is disposed in said connector housing.

8. The cleaning assembly of claim 1, wherein the cleaning pad is formed of a compliant material.

9. The cleaning assembly of claim 8, further comprising slits in the cleaning pad and passageways in the assembly housing being aligned with the slits.

10. The cleaning assembly of claim 1, wherein said assembly housing and said connector housing mechanically interengage when mated.

11. The cleaning assembly of claim 1, wherein said connector housing comprises a first inner housing containing said ferrule and a first outer housing containing said first inner housing, said assembly housing comprises a second inner housing containing said cleaning insert and a second outer housing containing said second inner housing, said first and second inner housings have latches and are configured to coupling with each other during mating, said first and second outer housing actuating said latch of said second and first inner housing respectively to decouple said first and second housings during unmating.

12. The cleaning assembly of claim 1, wherein the end of said assembly housing that mates with said optical connector has an opening to provide sufficient access for said insert to be inserted into and removed from said assembly housing.

13. A cleaning card for cleaning ferrules which are contained in connector housings of an optical connectors mounted on a backplane, each of said optical connectors being adapted to mate respectively with a mating housing of a mating connector to effect an optical connection therebetween, said cleaning card comprising:

a daughter card having a plurality of cleaning assemblies mounted along an edge;
each of said cleaning assemblies comprising at least:
an assembly housings substantially identical to said mating housing and capable of mating with said connector housing of said optical connector; and
a cleaning insert having a cleaning pad and being disposed in said assembly housing such that, upon mating of said assembly housing with said optical connector, said cleaning pad contacts said ferrule.

14. The cleaning card of claim 13, wherein said assembly housing is substantially identical to said connector housing of said optical connector.

15. The cleaning card of claim 13, wherein said cleaning insert is disposed in said assembly housing in substantially the same configuration as said ferrule is disposed in said connector housing.

16. A cleaning insert for use with a cleansing assembly having a housing capable of mating with an optical connector containing a ferrule in a connector housing, said cleaning insert comprising:

a body portion configured for insertion into said housing and having at least one compliant leg for interengagement with said housing;
a cleaning pad attached to said body portion; and
wherein said cleaning insert is disposed in said housing such that, upon mating of said housing with said optical connector, said cleaning pad contacts said ferrule.

17. The cleaning insert of claim 16, wherein said cleaning pad is treated with a tacky substance to lift debris from said ferrule.

18. The cleaning card of claim 16, wherein the cleaning pad is formed of a compliant material.

19. The cleaning card of claim 18, further comprising slits in the cleaning pad.

* * * * *